(No Model.)
J. M. KEEN.
COMBINED BICYCLE STEP AND BRAKE.
No. 590,105.  Patented Sept. 14, 1897.
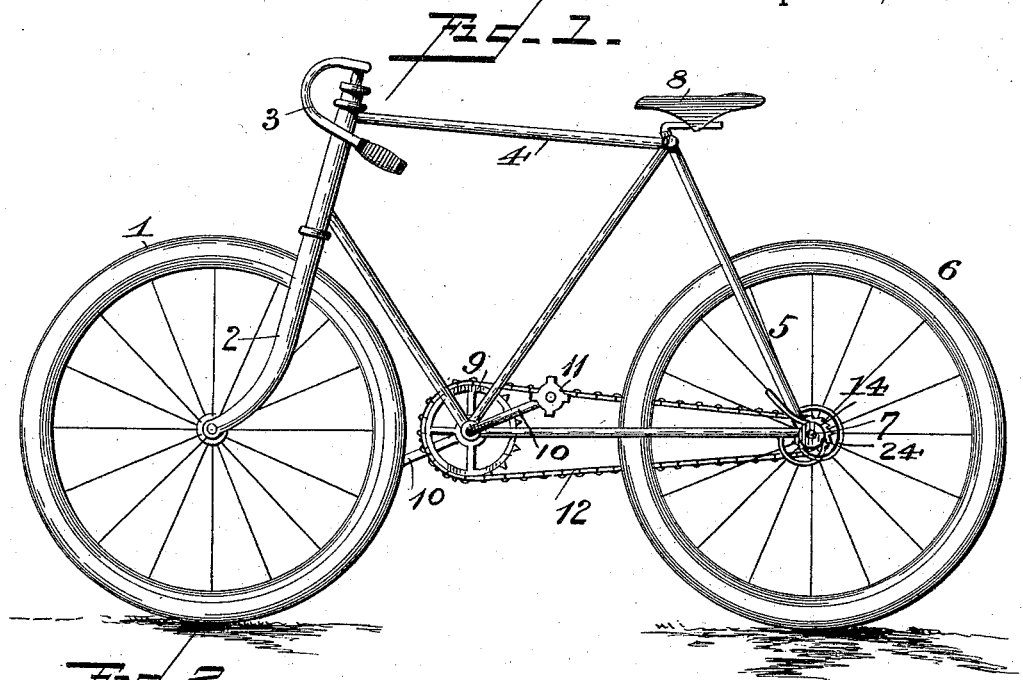
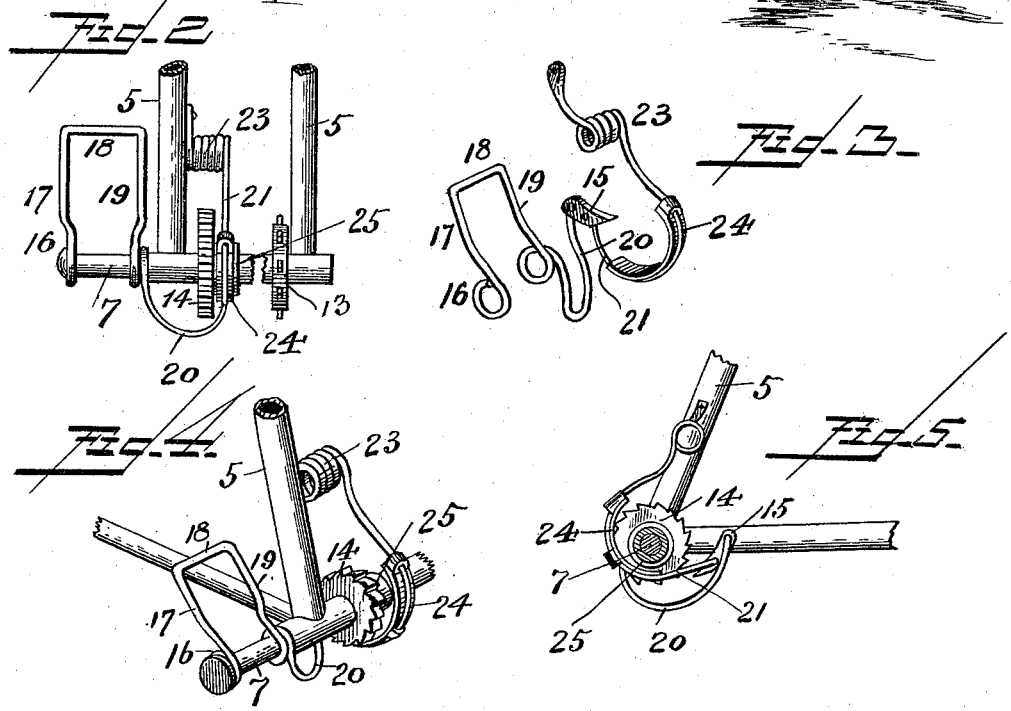
Witnesses:
Inventor:
James M. Keen,
Attorneys.

UNITED STATES PATENT OFFICE.

JAMES MORAL KEEN, OF DIGBY, CANADA.

COMBINED BICYCLE STEP AND BRAKE.

SPECIFICATION forming part of Letters Patent No. 590,105, dated September 14, 1897.

Application filed December 8, 1896. Serial No. 614,914. (No model.)

*To all whom it may concern:*

Be it known that I, JAMES MORAL KEEN, a subject of the Queen of Great Britain, and a resident of Digby, in the Province of Nova Scotia and Dominion of Canada, have invented certain new and useful Improvements in a Combined Bicycle Step and Brake; and I do hereby declare that the following is a full, clear, and exact description of the invention, which will enable others skilled in the art to which it appertains to make and use the same, reference being had to the accompanying drawings, which form a part of this specification.

My invention relates to improvements in combined bicycle steps and brakes, and its object is to provide an improved construction of the same whereby when a person depresses the step in mounting the bicycle it will aid in starting the latter, and the construction also being such that a rider by removing his foot from the pedal, pressing the step in the reverse direction, can brake or check the bicycle.

The invention consists in the novel construction and combination of parts hereinafter fully described and claimed.

In the accompanying drawings, Figure 1 is a side elevation of a bicycle with my improved step and brake. Fig. 2 is an end view, on an enlarged scale, of the combined step and brake. Fig. 3 is a perspective view of the step and brake detached from the bicycle. Fig. 4 is a perspective view showing the step and brake and ratchet-wheel. Fig. 5 is an elevation of the device, looking from the inner side, also showing the sleeve, collar, and ratchet-wheel.

In the said drawings the reference-numeral 1 designates the front wheel of a bicycle; 2, the fork; 3, the handle-bar; 4, the frame; 5, the rear fork; 6, the rear wheel; 7, its shaft or axle; 8, the saddle; 9, the driving-sprocket; 10, the cranks; 11, the pedals, and 12 the sprocket-chain connected with the sprocket 13, secured to the axle of the rear wheel 6. These parts may be of any ordinary or suitable construction and form no part of the present invention.

Fixed to the shaft or axle 7 is the driving-wheel 6, and also secured to said axle is a ratchet-wheel 14, with which engages a pawl 15, connected with an extension of the step upon which the rider places his foot in mounting the bicycle. This step consists of a single piece of stiff wire bent into a loop 16 at one end, which engages with the end of the axle or shaft 7, which is extended outward beyond the frame of the bicycle. The wire is then extended upwardly and then transversely and then downwardly, forming arms 17, 18, and 19, which constitute the step upon which the foot is placed in mounting, and which when pressed backwardly by a person mounted on the bicycle will operate a brake, as hereinafter described. The said wire is then bent around the shaft or axle, and then curved downwardly and inwardly underneath the frame of the bicycle and then curved upwardly, forming an arm 20, to the end of which is pivoted the pawl 15, which engages with the ratchet-wheel 14. Pivoted to said pawl, intermediate the ends thereof, is a curved spring-arm 21, the other end of which is formed into a coil 23 and secured to one of the arms of the rear fork 5, and secured to this arm 21 is a curved brake-shoe 24, which is adapted to engage with a collar 25, secured to the shaft or axle, and by frictional contact therewith check or brake the rear wheel of the bicycle, which, as before stated, is also secured to said axle.

In normal position the step will occupy approximately a vertical position with the pawl out of engagement with the ratchet and the brake-shoe out of contact with the collar.

The operation is as follows: In mounting the bicycle the rider places his foot on the step, depressing the same by his weight and causing the pawl to engage with and rotate the ratchet-wheel, which in turn will rotate the axle and rear wheel and thus aid in starting the machine. When the weight is relieved, the pawl will be returned to normal position by the spring-arm 21.

While the machine is in motion and the rider desires to brake the wheel, he removes one of his feet from the pedal and pushes backward the step, which will cause the brake-shoe to contact with the collar of the axle and brake or check the wheel.

I do not wish to limit myself to the details of construction herein described, as many modifications may be made therein without departing from the principle of the invention.

Having thus fully described my invention, what I claim is—

1. In a bicycle, the combination with the axle, the ratchet-wheel and collar, of the step pivotally connected with the rear axle and provided with a curved arm, the pawl pivoted thereto, the spring-arm pivotally connected with said pawl and with the rear fork of the bicycle-frame and the curved brake-shoe secured to said spring-arm, substantially as described.

2. In a bicycle the combination with the rear axle, the wheel, the ratchet-wheel and the collar, of the step consisting of the wire having one end looped around the outer end of the axle and then bent upwardly transversely and downwardly and bent around the axle and the opposite end bent downwardly inwardly and upwardly forming a curved arm, the pawl pivoted thereto, the arm connected at one end with said pawl and the other end formed with a spring-coil secured to the rear fork of the bicycle-frame, and the curved brake-shoe secured to said spring-arm, substantially as described.

In testimony that I claim the foregoing as my own I have hereunto affixed my signature in presence of two witnesses.

JAMES MORAL KEEN.

Witnesses:
GEORGE APPLETON ROBINSON,
ROBERT GORDON MONROE.